(12) United States Patent
Hofmann

(10) Patent No.: US 8,322,774 B2
(45) Date of Patent: Dec. 4, 2012

(54) MOTOR VEHICLE

(75) Inventor: Peter Hofmann, Neuhausen (DE)

(73) Assignee: Dr. Ing. h.c.F. Porsche AG (DE)

( * ) Notice: Subject to any disclaimer, the term of this patent is extended or adjusted under 35 U.S.C. 154(b) by 352 days.

(21) Appl. No.: 12/719,994

(22) Filed: Mar. 9, 2010

(65) Prior Publication Data

US 2010/0237648 A1 Sep. 23, 2010

(30) Foreign Application Priority Data

Mar. 18, 2009 (DE) .......................... 10 2009 014 964

(51) Int. Cl.
*B60P 7/00* (2006.01)
(52) U.S. Cl. .................................................... 296/37.16
(58) Field of Classification Search ............... 296/37.16, 296/37.8, 24.43, 98, 37.14; 224/542; 410/97, 410/100, 118; 160/370.22, DIG. 2
See application file for complete search history.

(56) References Cited

U.S. PATENT DOCUMENTS 5,324,089 A  6/1994 Schlachter
6,099,222 A * 8/2000 Moore

FOREIGN PATENT DOCUMENTS

| CN | 101380925 A | 3/2009 |
|---|---|---|
| DE | 43 41 942 A1 | 6/1995 |
| DE | 10 2005 006 686 A1 | 8/2006 |
| FR | 2 616 560 A1 | 12/1988 |

OTHER PUBLICATIONS

German Patent and Trademark Office Search Report, dated Jul. 15, 2009.

* cited by examiner

*Primary Examiner* — Stephen Gordon
(74) *Attorney, Agent, or Firm* — Gerald E. Hespos; Michael J. Porco

(57) ABSTRACT

A motor vehicle has a luggage compartment located behind a row of seats, which luggage compartment is accessible from above by swivelling up a tailgate. There is provided a swivel-adjustable luggage compartment cover which is pivoted to the motor vehicle in its front end region and is positively coupled to the tailgate by coupling elements in its rear end region, so that opening of the tailgate causes the luggage compartment cover arranged below it to be opened. What is important is that the luggage compartment cover can be removed only when the tailgate is open.

11 Claims, 3 Drawing Sheets

MOTOR VEHICLE

CROSS-REFERENCE TO RELATED APPLICATION

This application claims the priority, under 35 U.S.C. § 119, of German application DE 10 2009 014 964.3, filed Mar. 18, 2009; the prior application is herewith incorporated by reference in its entirety.

BACKGROUND OF THE INVENTION

1. Field of the Invention:

The present invention relates to a motor vehicle with a luggage compartment located behind a row of seats. The luggage compartment is accessible from above by swivelling up a tailgate, there being provided a swivel-adjustable luggage compartment cover which is pivoted to the motor vehicle in its front end region and is positively coupled to the tailgate by coupling elements in its rear end region, so that opening of the tailgate causes the luggage compartment cover arranged below it to be opened.

Generic motor vehicles with a luggage compartment located behind a row of seats are sufficiently known, the luggage compartment usually being accessible from above by raising a tailgate. If a rear window is integrated in the tailgate, the motor vehicle is usually referred to as a hatchback. Usually arranged below the openable tailgate is a swivel-adjustable luggage compartment cover which is pivoted to the motor vehicle in its front end region and is positively coupled to the tailgate by coupling elements in its rear end region, so that opening of the tailgate necessarily causes the luggage compartment cover arranged below it to be opened, thereby giving access to the luggage compartment.

Such luggage compartment covers generally also serve as visual protection for objects arranged below the cover in the luggage compartment, so that, with a tailgate closed, a free view of the luggage compartment and of articles stowed therein is not possible. However, if such luggage compartment covers are installed in premium vehicles, a potential offender may be induced, simply on account of the premium vehicle, to break a rear window in the tailgate and remove the luggage compartment cover without knowing in advance whether such a break-in is worthwhile.

SUMMARY OF THE INVENTION

It is accordingly an object of the invention to provide a motor vehicle which overcomes the above-mentioned disadvantages of the prior art devices of this general type, which is an improved or at least an alternative embodiment for a generic motor vehicle which is distinguished, in particular, by enhanced protection against theft.

With the foregoing and other objects in view there is provided, in accordance with the invention a motor vehicle. The motor vehicle includes a tailgate, a row of seats, and a luggage compartment disposed behind the row of seats. The luggage compartment is accessible from above by swivelling up the tailgate. The motor vehicle further has coupling elements and a swivel-adjustable luggage compartment cover with a front end region which is pivoted to the motor vehicle and a rear end region form-locking connected to the tailgate via the coupling elements so that opening of the tailgate causes the luggage compartment cover disposed below the tailgate to be opened. The swivel-adjustable luggage compartment cover can be removed only when the tailgate is open.

The present invention is based on the general concept of jamming in position a luggage compartment cover for covering a luggage compartment located behind a row of seats, especially in the case of premium vehicles, by a swivellable tailgate arranged above the cover, so that, with the tailgate closed, the luggage compartment cover is jammed by the tailgate and therefore cannot be simply removed. For this purpose, a motor vehicle according to the invention has in the usual manner a swivellable tailgate with a likewise swivellable luggage compartment cover arranged below it. In its front region the luggage compartment cover is pivoted to a body of the motor vehicle and in its rear end region is positively coupled (form lockingly connected) to the tailgate by coupling elements, so that opening of the tailgate necessarily causes the luggage compartment cover arranged below it to be opened. However, if the tailgate is closed and locked, the luggage compartment cover not only covers the luggage compartment arranged below it but in addition is jammed by the closed tailgate, so that even breaking of the rear window in the tailgate does not give access to the luggage compartment. Unlike luggage compartment covers known from the prior art, the luggage compartment cover according to the invention cannot, with the tailgate closed, be either raised or moved in any other direction far enough to be able to be removed, or at least to give access to the luggage compartment arranged below it. The inventive luggage compartment cover therefore gives free access to the luggage compartment only if the tailgate is in an at least partially open state, whereby especially effective protection against theft can be achieved.

In an advantageous development of the inventive solution, the luggage compartment cover has a support layer with a decor layer located above it and an insulation layer arranged below it. This laminated structure of the luggage compartment cover enables the same materials to be used, at least for the support layer and the insulation layer, in particular a sound insulation layer, arranged below it, while the decor layer applied from above to the support layer is adapted, for example, to individual model lines of the motor vehicle. The support layer may be formed, for example, from plastics material, in particular glass-fiber reinforced plastic, and thereby has both the required stiffness and a low weight desired in sports car construction. To reinforce the inventive luggage compartment cover with fibers, carbon or glass fibers may, in particular, be used.

In a further advantageous embodiment of the inventive solution, the luggage compartment cover has in its rear end region laterally projecting support elements which, when the tailgate is closed, engage in wall recesses and are pressed down by the tailgate and thereby fixed. In this case elastic buffer elements are mounted on the support elements. The elastic buffer elements produce an elastic preload thereof with the tailgate closed, whereby, in particular, unpleasant vibration noises while the motor vehicle is moving can be suppressed. At the same time, such buffer elements offer the great advantage that, in the event of misuse, that is, of improper access such as a break-in, they additionally make it more difficult to pull out the laterally projecting support elements from the wall recesses and thereby additionally improve protection against theft. In general, such elastic buffer elements may be made of rubber or of a different plastics material.

Other features which are considered as characteristic for the invention are set forth in the appended claims.

Although the invention is illustrated and described herein as embodied in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
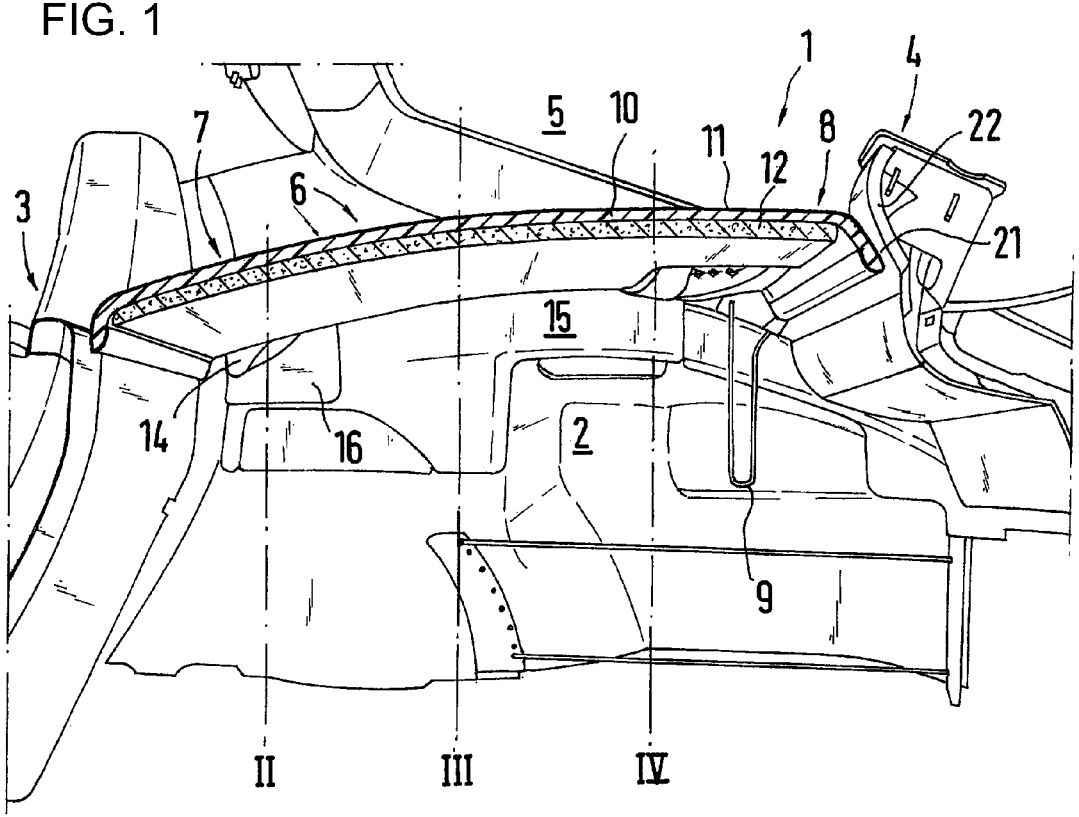
FIG. 1 is a diagrammatic, longitudinal section view through a motor vehicle according to the invention in a region of a luggage compartment cover.

Referring now to the figures of the drawing in detail and first, particularly, to FIG. 1 thereof, there is shown a motor vehicle 1 according to the invention, which is represented only in the region of a luggage compartment 2 located behind a row of seats 3, has a tailgate 4 with a rear window 5. The luggage compartment 2 is accessed in a known fashion by swivelling up the tailgate 4, a luggage compartment cover 6 being provided to form an upper closure of the luggage compartment 2 and being intended, in particular, to form a visual protection for articles stowed in the luggage compartment 2. The luggage compartment cover 6 is also swivel-adjustable in a known fashion and to this end is pivoted to the motor vehicle 1 in its front end region 7. In its rear end region 8 it is form lockingly connected to the tailgate 4 by coupling elements 9, for example cables or strings. Upon opening of the tailgate 4, the form locking connection automatically causes opening of the luggage compartment cover 6 arranged below it and therefore of the luggage compartment 2. According to the invention, the luggage compartment cover 6 can be removed or extracted from the luggage compartment 2 only if the tailgate 4 is unlocked and open. As can be seen in particular in FIG. 1, when the tailgate 4 is locked and closed the rear end region 8 of the luggage compartment cover 6 is held down by the tailgate 4, so that, even if the rear window 5 is broken, simple removal of the luggage compartment cover 6, and therefore direct access to the luggage compartment 2 located below it, cannot be achieved.

The luggage compartment cover 6 according to the invention usually has a laminated structure and accordingly has a support layer 10 with a decor layer 11 arranged thereon from above and an insulation layer 12 arranged below the support layer 10.

Figure 2:
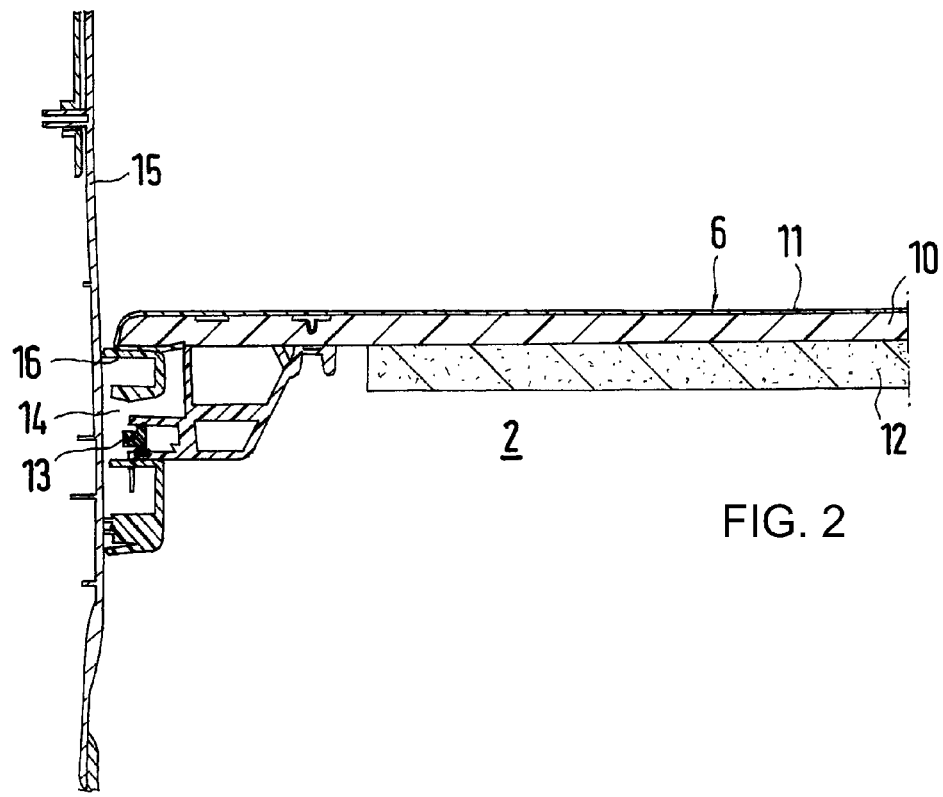
FIG. 2 is a sectional view taken along the section plane II shown in FIG. 1.

The attachment of the inventive luggage compartment cover 6 in its front end region 7 is illustrated, in particular, in FIGS. 1 and 2. The luggage compartment cover 6 has laterally projecting pegs 13 in the front end region 7, by which it is guided in associated curved guide tracks 14 arranged in the vehicle wall. The guide tracks 14, open rearwardly or upwardly, are connected, in particular welded, to a C-pillar trim panel 15. Above the pegs 13 the luggage compartment cover 6 rests on a wall bracket 16 which may be, for example, an integral component of the guide track 14. The laterally projecting pegs 13 for positioning the luggage compartment cover 6 in the wall-mounted guide tracks 14 are usually screwed to an underside of the luggage compartment cover 6.

Figure 3:
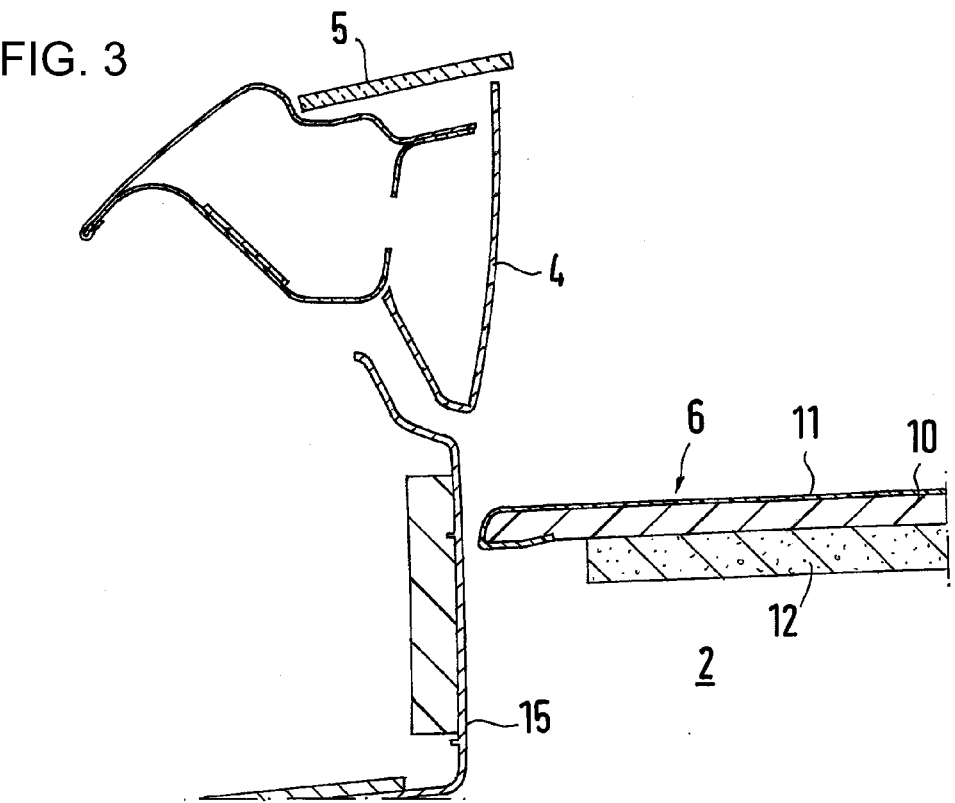
FIG. 3 is a sectional view taken along the section plane III shown in FIG. 1.

In the sectional representation in section plane III according to FIG. 3, it can be seen that the luggage compartment cover 6 is arranged in a non-touching manner with respect to the C-pillar trim panel 15, that is, does not come into contact therewith.

Figure 4:
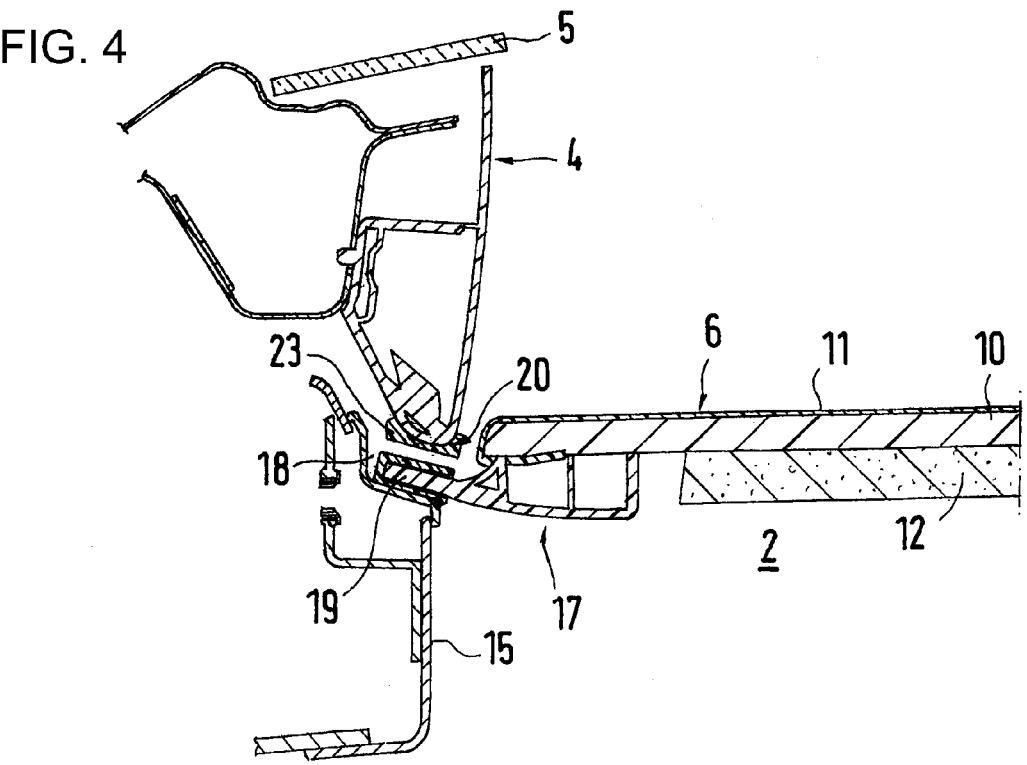
FIG. 4 is a sectional view taken along the section plane IV shown in FIG. 1.

According to FIG. 4, which shows a sectional representation in section plane IV, that is, in the rear end region 8, the luggage compartment cover 6 has laterally projecting support elements 17 which, when the tailgate 4 is closed, engage in wall recesses 18 and are pressed down by the tailgate 4 and thereby fixed. The laterally projecting support elements 17 may have, in particular, an at least partially elastic tongue 19 on which elastic buffer elements 20 are mounted. When the tailgate 4 is closed, these elastic buffer elements 20 are compressed and thereby ensure an at least low-vibration mounting of the luggage compartment cover 6 to the motor vehicle 1. In general, the wall recesses 18 may be formed by suitable recess elements which are inserted in openings in an interior trim panel of a C-pillar and fastened to retaining elements of the C-pillar trim panel 15 located inside same. Furthermore, an especial advantage of the inventive elastic buffer elements 20 is that they additionally make more difficult, and preferably entirely prevent, removal of the luggage compartment cover 6 while the tailgate 4 is closed.

Figure 5:
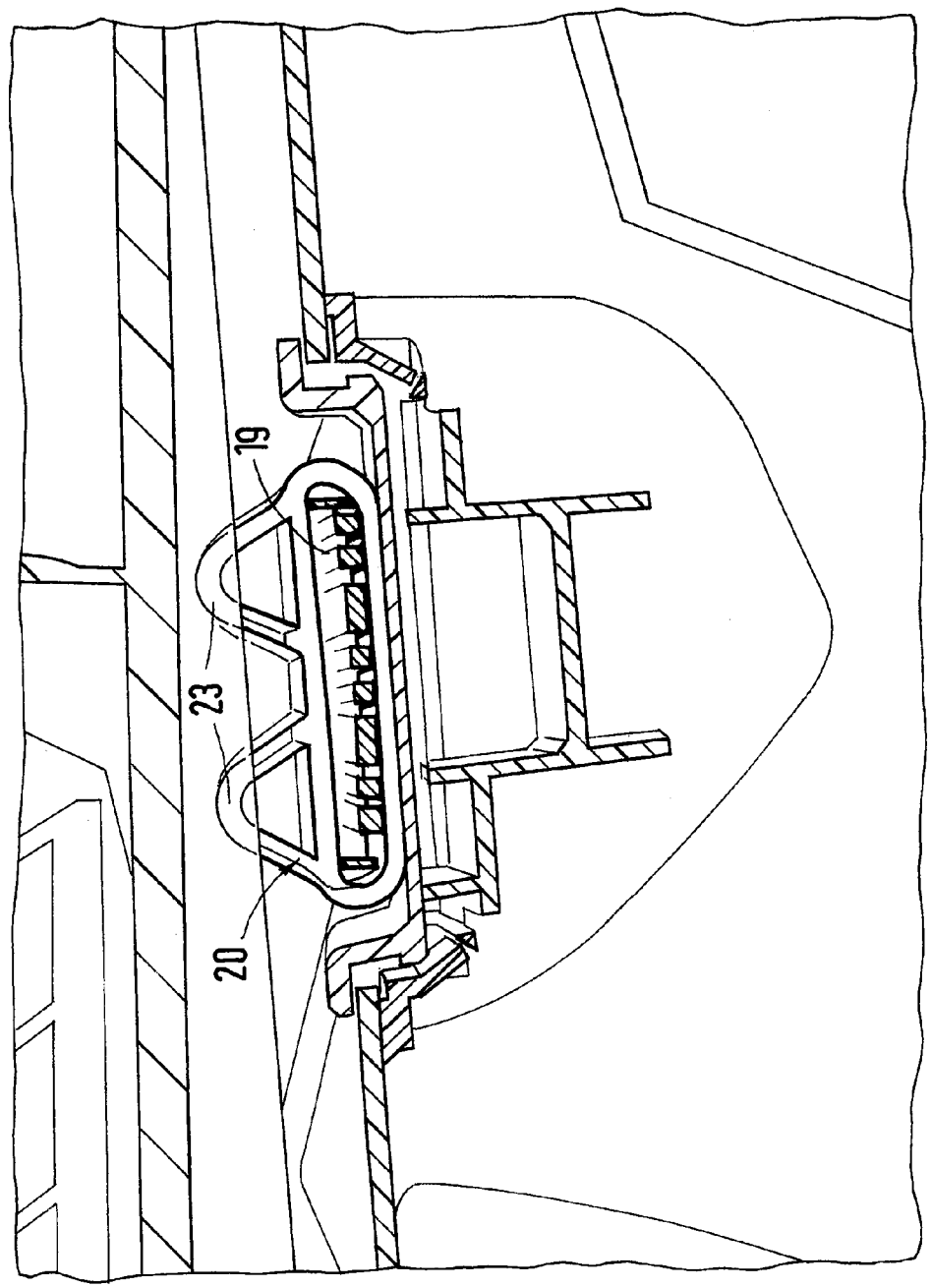
FIG. 5 is a sectional view in a region of a support element.

FIG. 5 is a sectional representation through one of the support elements 17, it being clearly apparent that the tongue 19 is sheathed by an associated buffer element 20. The buffer element 20 has on its upper side two adjacently-arranged humps 23, each disposed in a transverse direction, which humps 23 may contain an enclosed air volume which additionally increases the elasticity thereof.

The luggage compartment cover 6 according to the invention for protecting articles or valuables arranged in a luggage compartment 2 below it cannot be removed with the tailgate 4 closed and locked, even if the rear window 5 is broken, since, first, the tailgate 4, in particular a tailgate trim panel thereof, rests under preload on the buffer elements 20 of the luggage compartment cover 6 located below it and, second, only minimal displacement of the luggage compartment 6 in the longitudinal direction of the vehicle is possible. In addition, a rear, downwardly-angled end of the luggage compartment cover 6 forms a narrow gap 21 (see FIG. 1) to an adjacent transverse tailgate trim panel 22. Especially in the case of premium vehicles, in which it is supposed that valuable items are stored therein merely on account of the vehicle, a luggage compartment cover 6 configured according to the invention considerably improves protection against theft, since simple breakage of the rear window 5 no longer gives direct access to the luggage compartment 2. Rather, even with the rear window 5 broken, the inventive luggage compartment cover 6 cannot be removed if the tailgate 4 is not open. However, it is often not possible for a thief to open the tailgate 4 through lack of a key.

A form-locking connection (positively coupled connection) is one that connects two elements together due to the shape of the elements themselves, as opposed to a force-locking connection, which locks the elements together by force external to the elements.

What invention claimed is:

1. A motor vehicle, comprising:
a tailgate;
a row of seats;
a luggage compartment disposed behind said row of seats, said luggage compartment is accessible from above by swiveling up said tailgate;

coupling elements; and a swivel-adjustable luggage compartment cover having a support layer, a decor layer disposed above said support layer and an insulation layer disposed below said support layer, a front end region of said luggage compartment cover being pivoted to the motor vehicle and a rear end region form-locking connected to said tailgate by means of said coupling elements so that opening up said tailgate causes said luggage compartment cover disposed below said tailgate to be opened, said swivel-adjustable luggage compartment cover can be removed only when said tailgate is open.

2. A motor vehicle, comprising:

a vehicle body having wall recesses formed therein;

a tailgate;

a row of seats;

a luggage compartment disposed behind said row of seats, said luggage compartment is accessible from above by swivelling up said tailgate;

coupling elements; and a swivel-adjustable luggage compartment cover having a front end region that is pivoted to the motor vehicle and a rear end region form-locking connected to said tailgate by means of said coupling elements so that opening up said tailgate causes said luggage compartment cover disposed below said tailgate to be opened, said swivel-adjustable luggage compartment cover can be removed only when said tailgate is open, wherein said swivel-adjustable luggage compartment cover has in said rear end region laterally projecting support elements which, with said tailgate closed, engage in said wall recesses of said vehicle body and are pressed down by said tailgate and thereby fixed.

3. The motor vehicle according to claim 2, wherein said swivel-adjustable luggage compartment cover has a support layer, a decor layer disposed above said support layer, and an insulation layer disposed below said support layer.

4. The motor vehicle according to claim 2, wherein:

said vehicle body includes a C-pillar trim panel having openings formed therein and retaining elements; and said wall recesses are recess elements inserted in said openings in said C-pillar trim panel and are fastened to said retaining elements of said C-pillar trim panel located inside said C-pillar trim panel.

5. The motor vehicle according to claim 2, wherein said laterally projecting support elements have elastic buffer elements mounted thereon.

6. The motor vehicle according to claim 5, wherein said elastic buffer elements have an upper side with two adjacently-disposed humps each disposed in a transverse direction.

7. The motor vehicle according to claim 4, wherein:

said vehicle body has a vehicle wall with C-shaped guide tracks; and said swivel-adjustable luggage compartment cover has in said front end region laterally projecting pegs, by means of said laterally projecting pegs said swivel-adjustable luggage compartment cover is guided in said C-shaped guide tracks disposed in said vehicle wall.

8. The motor vehicle according to claim 7, wherein said C-shaped guide tracks are connected to said C-pillar trim panel forming part of said vehicle wall.

9. The motor vehicle according to claim 7, wherein said laterally projecting pegs are screwed to an underside of said swivel-adjustable luggage compartment cover.

10. The motor vehicle according to claim 7, further comprising a wall bracket, said swivel-adjustable luggage compartment cover rests on said wall bracket above said laterally projecting pegs.

11. The motor vehicle according to claim 7, wherein said C-shaped guide tracks are welded to said C-pillar trim panel.

* * * * *